(12) United States Patent
Miucic

(10) Patent No.: US 8,224,370 B2
(45) Date of Patent: Jul. 17, 2012

(54) METHOD OF CONTROLLING A COMMUNICATION SYSTEM IN A MOTOR VEHICLE

(75) Inventor: Radovan Miucic, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 12/501,381

(22) Filed: Jul. 10, 2009

(65) Prior Publication Data

US 2011/0009151 A1 Jan. 13, 2011

(51) Int. Cl.
*H04B 7/00* (2006.01)
(52) U.S. Cl. ...... 455/522; 455/69; 455/569.2; 340/7.36; 340/7.37
(58) Field of Classification Search .............. 455/569.2, 455/575.9, 39, 507, 3.01, 414.2, 456.1, 522, 455/67.11, 68, 69, 70; 701/200, 24, 400; 73/178 R; 340/991–993, 7.36, 7.37
See application file for complete search history.

(56) References Cited

U.S. PATENT DOCUMENTS

| | | | |
|---|---|---|---|
| 5,867,122 A | | 2/1999 | Zahm et al. |
| 6,218,961 B1 | | 4/2001 | Gross et al. |
| 6,542,808 B2 | | 4/2003 | Mintz |
| 7,355,525 B2 | | 4/2008 | Tengler et al. |
| 7,433,773 B2 | | 10/2008 | Tengler et al. |
| 2002/0142803 A1* | 10/2002 | Yamamoto ..................... 455/557 |
| 2003/0120396 A1* | 6/2003 | Vollmer et al. ................... 701/1 |
| 2004/0230373 A1* | 11/2004 | Tzamaloukas ................ 701/208 |
| 2007/0002866 A1 | 1/2007 | Belstner et al. |
| 2007/0183460 A1* | 8/2007 | Enders et al. ................. 370/503 |
| 2008/0055068 A1 | 3/2008 | Van Wageningen et al. |
| 2008/0071438 A1* | 3/2008 | Nasr et al. ........................ 701/22 |
| 2008/0095163 A1 | 4/2008 | Chen et al. |
| 2008/0316052 A1 | 12/2008 | Ruffini |
| 2009/0055044 A1* | 2/2009 | Dienst ............................. 701/32 |
| 2009/0088924 A1 | 4/2009 | Coffee et al. |
| 2009/0161587 A1 | 6/2009 | Ishii et al. |
| 2010/0161481 A1* | 6/2010 | Littrell ........................... 705/40 |

FOREIGN PATENT DOCUMENTS

| | | |
|---|---|---|
| JP | 2001-093086 | 4/2001 |
| JP | 2005-057442 | 3/2005 |
| JP | 2007-336026 | 12/2007 |
| JP | 2008-192081 | 8/2008 |
| WO | WO 2007/075042 | 7/2007 |

OTHER PUBLICATIONS

International Search Report mailed Sep. 20, 2010, from PCT Application No. PCT/US 10/39728.
International Preliminary Report on Patentability (including Written Opinion of the ISA) mailed Jan. 19, 2012 in International Application No. PCT/US2010/039728.

\* cited by examiner

*Primary Examiner* — Dominic E Rego
(74) *Attorney, Agent, or Firm* — Plumsea Law Group, LLC; Mark E. Duell

(57) ABSTRACT

A method of reducing channel utilization in a vehicle communication network is disclosed. The method includes a step of reducing the transmitting power of messages sent over the vehicle communication network when channel saturation occurs. The method also includes a step of increasing the transmitting period of messages sent over the vehicle communication network when channel saturation occurs. The method further includes steps of modifying the transmitting power and transmitting period of messages according to vehicle speed.

20 Claims, 9 Drawing Sheets

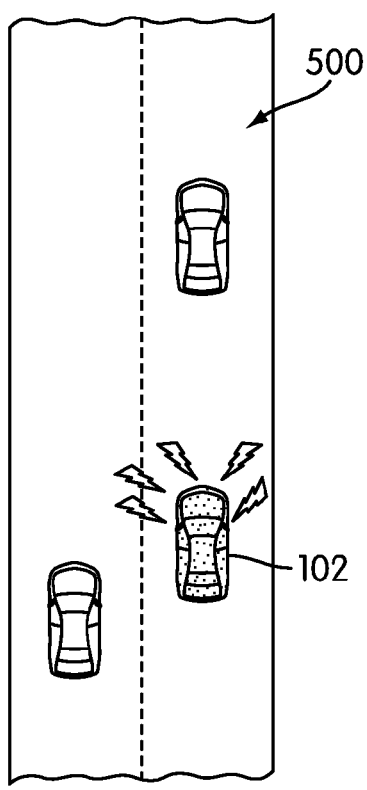
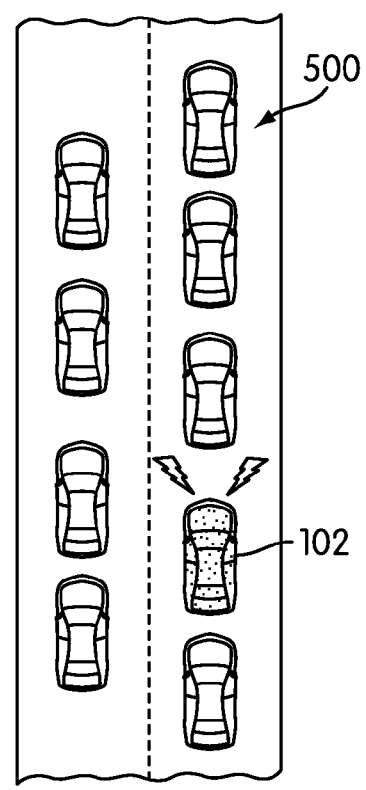
FIG. 5
FIG. 6

METHOD OF CONTROLLING A COMMUNICATION SYSTEM IN A MOTOR VEHICLE

BACKGROUND

The present invention relates generally to a motor vehicle, and in particular to a method for controlling a communication system in a motor vehicle.

Motor vehicles can include communication systems that are used to exchange information between vehicles. The communication systems may utilize wireless networks. The related art teaches methods of reducing communication congestion on a network. However, the related art lacks provisions for efficiently preventing channel saturation in situations involving heavy traffic congestion. There exists a need in the art for a method that addresses the shortcomings of the related art.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a motor vehicle, comprising the steps of: transmitting information at a transmitting power; determining a number of remote vehicles in communication with the motor vehicle, the communication being established on a vehicle communication network; determining if the number of remote vehicles is greater than a maximum allowed number, the maximum allowed number being associated with channel saturation of the vehicle communication network; and reducing the transmitting power when the number of remote vehicles is greater than the maximum allowed number.

In another aspect, the invention provides a method of operating a motor vehicle, comprising the steps of: transmitting information at a transmitting period; determining a number of remote vehicles in communication with the motor vehicle, the communication being established on a vehicle communication network; determining if the number of remote vehicles is greater than a maximum allowed number, the maximum allowed number being associated with channel saturation of the vehicle communication network; and increasing the transmitting period when the number of remote vehicles is greater than the maximum allowed number.

In another aspect, the invention provides a method of operating a motor vehicle, comprising the steps of: transmitting information using a transmitting characteristic; determining a vehicle speed; determining a number of remote vehicles in communication with the motor vehicle, the communication being established on a vehicle communication network; determining if the number of remote vehicles is greater than a maximum allowed number, the maximum allowed number being associated with channel saturation of the vehicle communication network; adjusting the transmitting characteristic according to the vehicle speed when the number of remote vehicles is greater than the maximum allowed number.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a schematic view of an embodiment of a motor vehicle transmitting information over a vehicle communication network;

FIG. 6 is a schematic view of an embodiment of a motor vehicle transmitting information over a vehicle communication network;

DETAILED DESCRIPTION

Figure 1:
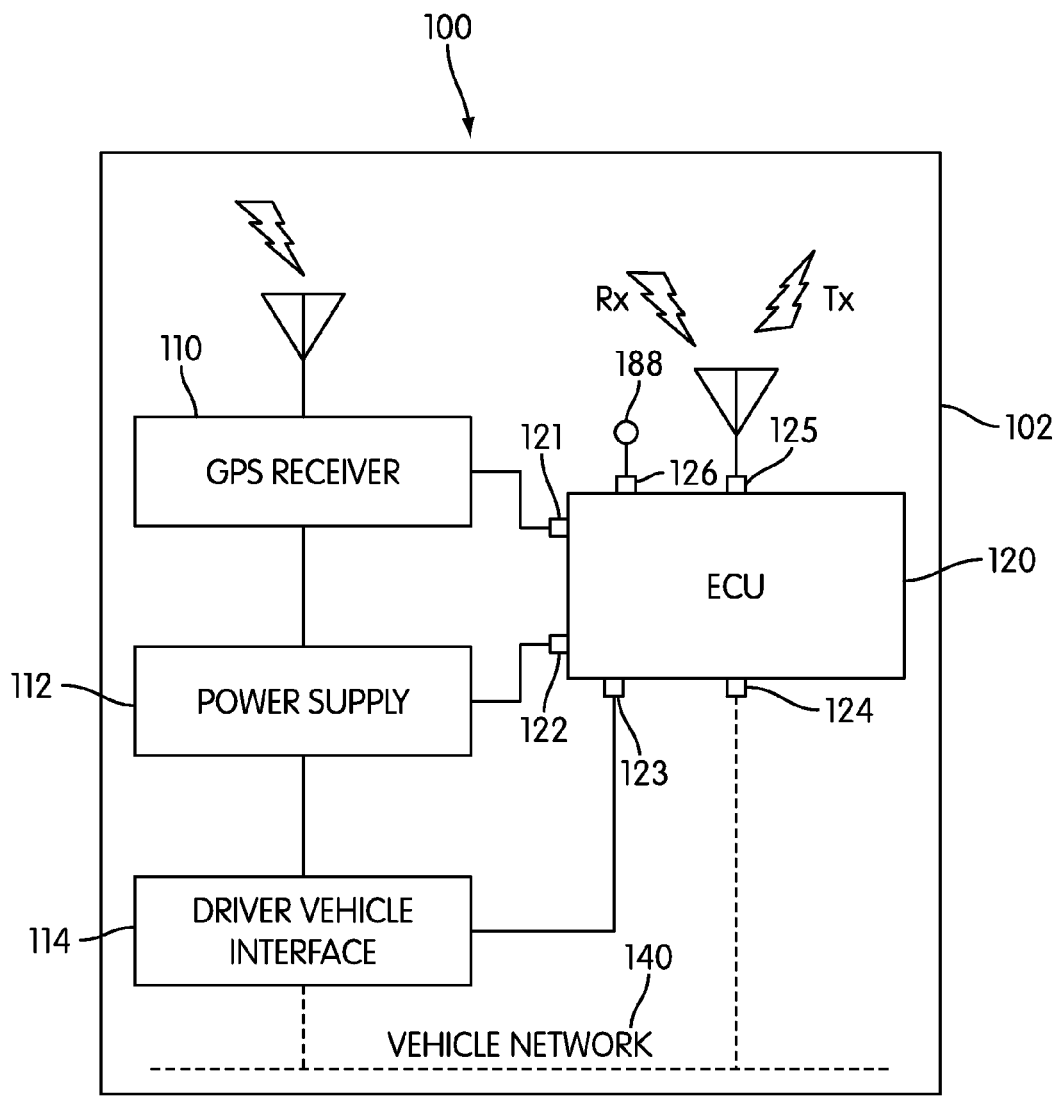
FIG. 1 is a schematic view of an embodiment of a motor vehicle.

FIG. 1 is a schematic view of an embodiment of communication system 100 for motor vehicle 102. For purposes of clarity, only some components of a motor vehicle may be shown. Furthermore, in other embodiments, additional components can be added or removed. Communication system 100 may include provisions for communicating various kinds of information between motor vehicle 102 and any other remote source capable of exchanging information including, but not limited to: remote vehicles, roadside units as well as other remote sources. Communication system 100 can be used with one or more systems of a motor vehicle. In some embodiments, communication system 100 could be used in conjunction with a navigation system to determine the locations of other vehicles as well as the locations of traffic signals or other roadway infrastructure. In other embodiments, communication system 100 could be used with a vehicle safety system. Examples of vehicle safety systems include collision warning systems, lane departure warning systems as well as other types of safety systems. For example, a collision warning system could be configured to receive information from remote vehicles using communication system 100 to determine the locations of other vehicles and to provide alerts to a driver of any potential collisions.

Motor vehicle 102 can include provisions for receiving navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

Motor vehicle 102 can include provisions for receiving GPS information. In some cases, motor vehicle 102 can include GPS receiver 110. In an exemplary embodiment, GPS receiver 110 can be used for gathering GPS information for any systems of a motor vehicle, including, but not limited to: GPS based navigation systems.

Motor vehicle 102 can include provisions for powering one or more devices. In some cases, motor vehicle 102 can include power supply 112. Generally, power supply 112 can be any type of power supply associated with a motor vehicle. In some cases, power supply 112 can be a car battery. In other cases, power supply 112 can be another type of power supply available within motor vehicle 102. Although power supply 112 is shown as connected to some components of motor vehicle 102 in the current embodiment, it will be understood that in other embodiment additional components can be connected to power supply 112. In still other cases, some components that are shown as connected to power supply 112 may not be connected to power supply 112.

Motor vehicle 102 can include provisions for communicating with a driver. In some embodiments, motor vehicle 102 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger. It will be further understood that in some embodiments, a driver vehicle interface can be associated directly with a navigation system of a motor vehicle. In other words, in some embodiments, a driver vehicle interface can be combined, or integrated into, a navigation system. With this arrangement, information communicated between a driver and one or more systems of a motor vehicle can be accomplished using an interface of a navigation system.

Motor vehicle 102 may include provisions for communicating, and in some cases controlling, the various components associated with motor vehicle 102. In some embodiments, motor vehicle 102 may be associated with a computer or similar device. In the current embodiment, motor vehicle 102 may include electronic control unit 120, hereby referred to as ECU 120. In one embodiment, ECU 120 may be configured to communicate with, and/or control, various components of motor vehicle 102. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include port 121 for communicating with GPS receiver 110. In particular, ECU 120 may be configured to receive GPS information from GPS receiver 110. In addition, ECU 120 can include port 122 for receiving power from power supply 112. Also, ECU 120 can include port 123 for communicating with driver vehicle interface 114. In particular, ECU 120 can be configured to transmit information to driver vehicle interface 114, as well as to receive information from driver vehicle interface 114.

A motor vehicle can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include port 125 that is configured to communicate with one or more DSRC devices. In an exemplary embodiment, port 125 may be associated with a DSRC antenna that is configured to transmit and/or receive vehicle information over one or more vehicle communication networks.

Motor vehicle 102 can include provisions for communicating with one or more components of a motor vehicle that are not associated directly, or indirectly, with motor vehicle 102. In some cases, ECU 120 may include additional ports for communicating directly with one or more additional devices of a motor vehicle, including various sensors or systems of the motor vehicle. In an exemplary embodiment, ECU 120 may include port 124 for communicating with vehicle network 140. By providing communication between ECU 120 and vehicle network 140, ECU 120 may have access to additional information concerning motor vehicle 102. For instance, in some cases, ECU 120 may be configured to receive information related to various operating conditions of a motor vehicle. Examples of information that may be received via vehicle network 140 include, but are not limited to: vehicle speed, engine speed, braking conditions, turning status, steering wheel angle, as well as other parameters associated with the operating condition of motor vehicle 102. In other embodiments, ECU 120 can include provisions for communicating directly with one or more sensors. In one embodiment, for example, ECU 120 can include port 126 for communicating with vehicle speed sensor 188. Vehicle speed sensor 188 could be any type of sensor known in the art for detecting a vehicle speed.

Motor vehicles associated with vehicle communication networks can be configured to exchange information. In some embodiments, motor vehicles can exchange basic safety messages (BSMs) via the vehicle communication networks. In some cases, basic safety messages can include information related to the position, motion, control and/or vehicle size of the transmitting vehicle. In other cases, a basic safety message can include additional information. In still other cases, a basic safety message may include less information. By transmitting basic safety messages to surrounding vehicles, each vehicle can exchange information that may be useful in facilitating safety for each driver. In some cases, the information contained in a basic safety message could then be utilized by a particular vehicle to control a vehicle safety system, such as a collision warning system.

Throughout this detailed discussion and in the claims, the term "message" is used to describe any collection or packet of information that is transmitted over a vehicle communication network. Messages could take the form of basic safety messages or may contain additional or less information than a basic safety message. Messages may comprise any number of bytes of information or data.

Figure 2:
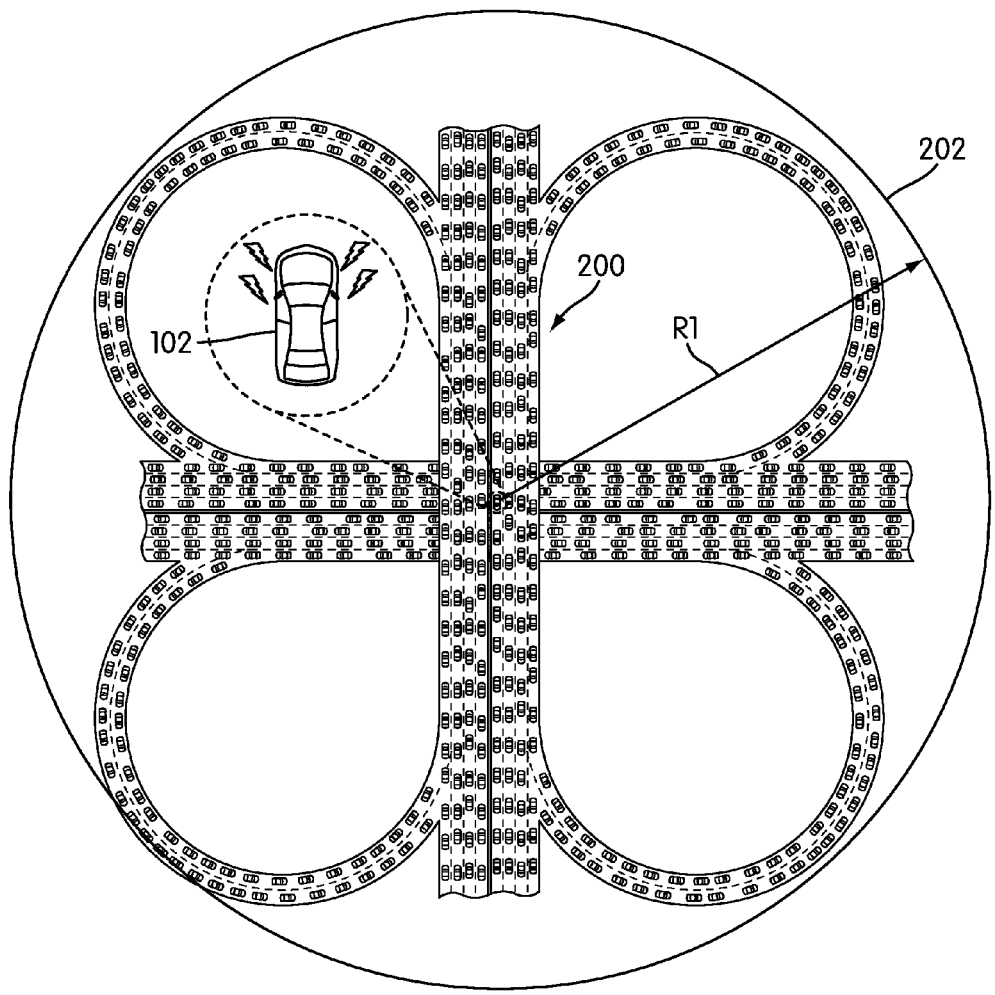
FIG. 2 is a schematic view of an embodiment of a motor vehicle in traffic congestion.

FIG. 2 illustrates an embodiment of a situation where motor vehicle 102 is in traffic along highway 200 and may attempt to exchange messages with surrounding vehicles over a vehicle communication network. In this situation, motor vehicle 102 may transmit messages over transmitting area 202. In particular, transmitting area 202 corresponds to an area with a radius R1. In other words, all vehicles within distance R1 from motor vehicle 102 may be capable of receiving any information transmitted by motor vehicle 102, such as a basic safety message. In addition, each of the other vehicles on highway 200 may also be transmitting messages on the vehicle communication network, which can be received by motor vehicle 102.

In situations where vehicles are packed closely together, which may occur in heavy traffic situations on highways, the total number of vehicles within the transmitting area of a motor vehicle may exceed the number of vehicles that can communicate on a network channel. The term "network channel" as used throughout this detailed description and in the claims refers to a particular range of frequencies that may be utilized in a vehicle communication network. These situations may result in channel saturation that prevents effective communication between motor vehicles attempting to exchange basic safety messages and/or other information.

In the embodiment illustrated in FIG. 2, for example, motor vehicle 102 may have a transmitting range of approximately 300 meters. In other words, any vehicles within a 300 meter radius of motor vehicle 102 may receive messages from motor vehicle 102. This range corresponds to the vehicles within transmitting area 202 in the current embodiment. In this case, motor vehicle 102 is within communication range of over 1,000 other vehicles. However, saturation of the network channel may occur whenever more than 50 vehicles are communicating on the same channel. In other words, this situation may substantially reduce to ability of motor vehicle 102 to communicate with the surrounding vehicles. Likewise, each of the other vehicles on highway 200 may have reduced communications with nearby vehicles due to the channel saturation of the network channel. Without access to basic safety messages from surrounding vehicles, the effectiveness of any vehicle safety systems associated with motor vehicle 102 and/or other vehicles on highway 200 may be substantially reduced.

A motor vehicle configured to communicate with other vehicles using a vehicle communication network can include provisions for reducing channel utilization in order to prevent channel saturation in congested situations. In some embodiments, a motor vehicle can be configured to reduce the transmitting power of messages sent over the vehicle communication network. In particular, a reduction in the transmitting power may reduce the transmitting radius or range. In other words, the total number of vehicles with which a motor vehicle can communicate may be reduced, thereby reducing channel utilization.

Figure 3:
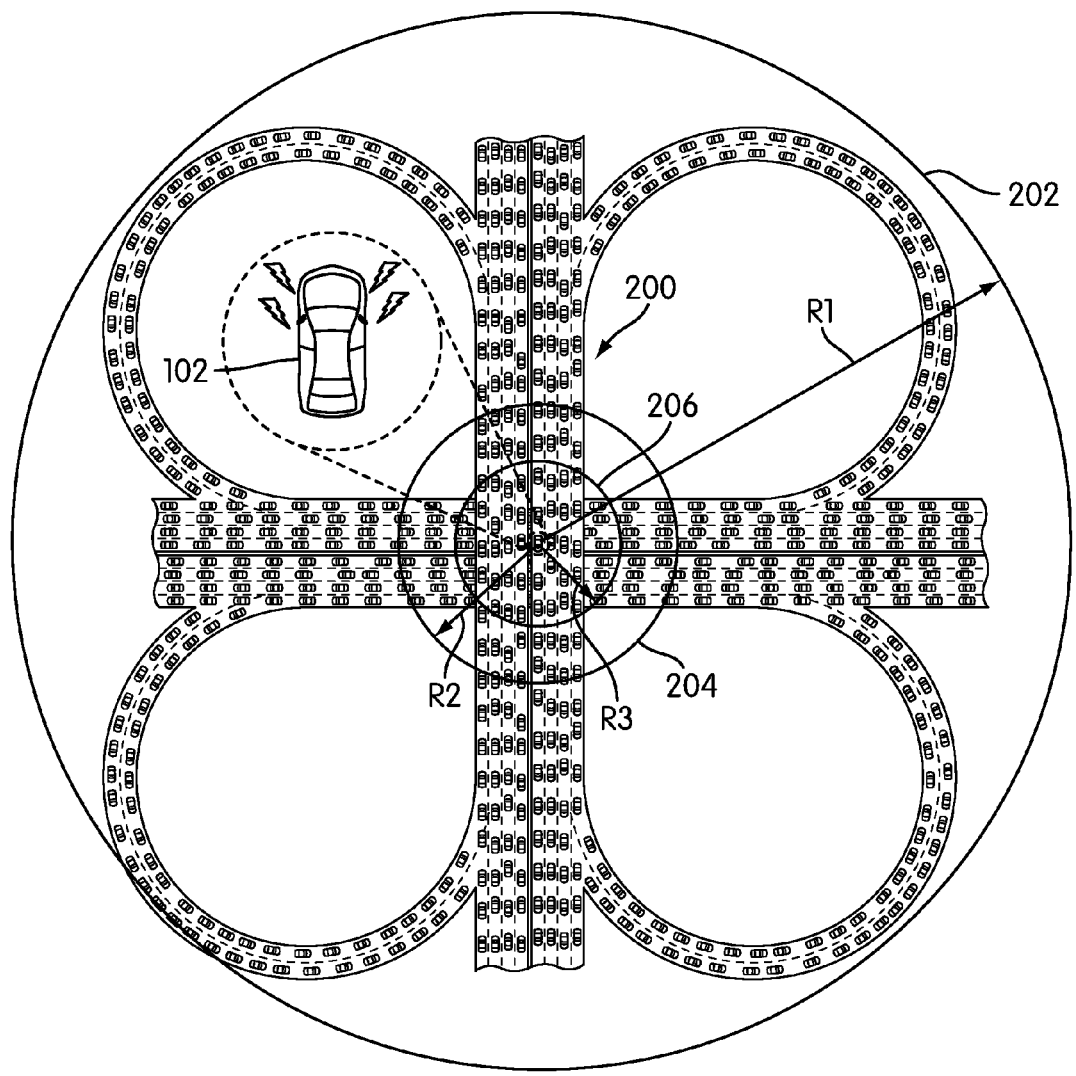
FIG. 3 is a schematic view of an embodiment of a motor vehicle in traffic congestion with reduced transmitting areas.

Referring now to FIG. 3, motor vehicle 102 may be configured to reduce the transmitting power of the basic safety messages and/or other transmitted information. For example, using a first transmitting power associated with first reduced transmitting area 204, motor vehicle 102 may only transmit messages to vehicles within radius R2 of motor vehicle 102. In the exemplary embodiment, radius R2 may have a value in the range between 50 meters and 100 meters. In this situation, motor vehicle 102 may transmit information that is received by approximately 100 to 120 vehicles.

As another example, motor vehicle 102 may use a second transmitting power that is less than the first transmitting power and which is associated with second reduced transmitting area 206. In this case, motor vehicle 102 may only transmit messages to vehicles within radius R3 of motor vehicle 102. In the exemplary embodiment, radius R3 may have a value in the range between 20 and 30 meters. In this situation, motor vehicle 102 may transmit messages that are received by approximately 40 to 50 vehicles. In situations where channel saturation may occur when more than 50 vehicles are broadcasting on the same channel, this arrangement can substantially reduce or eliminate channel saturation.

In some embodiments, the methods employed by motor vehicle 102 may also be employed by other vehicles on highway 200 to ensure that channel saturation is significantly reduced. In other words, other vehicles on highway 200 may also attempt to reduce the transmitting power of any messages sent over the vehicle communication network. This arrangement may help reduce the total number of vehicles communicating over a network channel since all vehicles may be operating at reduced transmitting power. In an exemplary embodiment, each motor vehicle on highway 200 may be equipped with a communication system that is configured to reduce transmitting power of any broadcast messages when there is channel saturation on a network channel.

Figure 4:
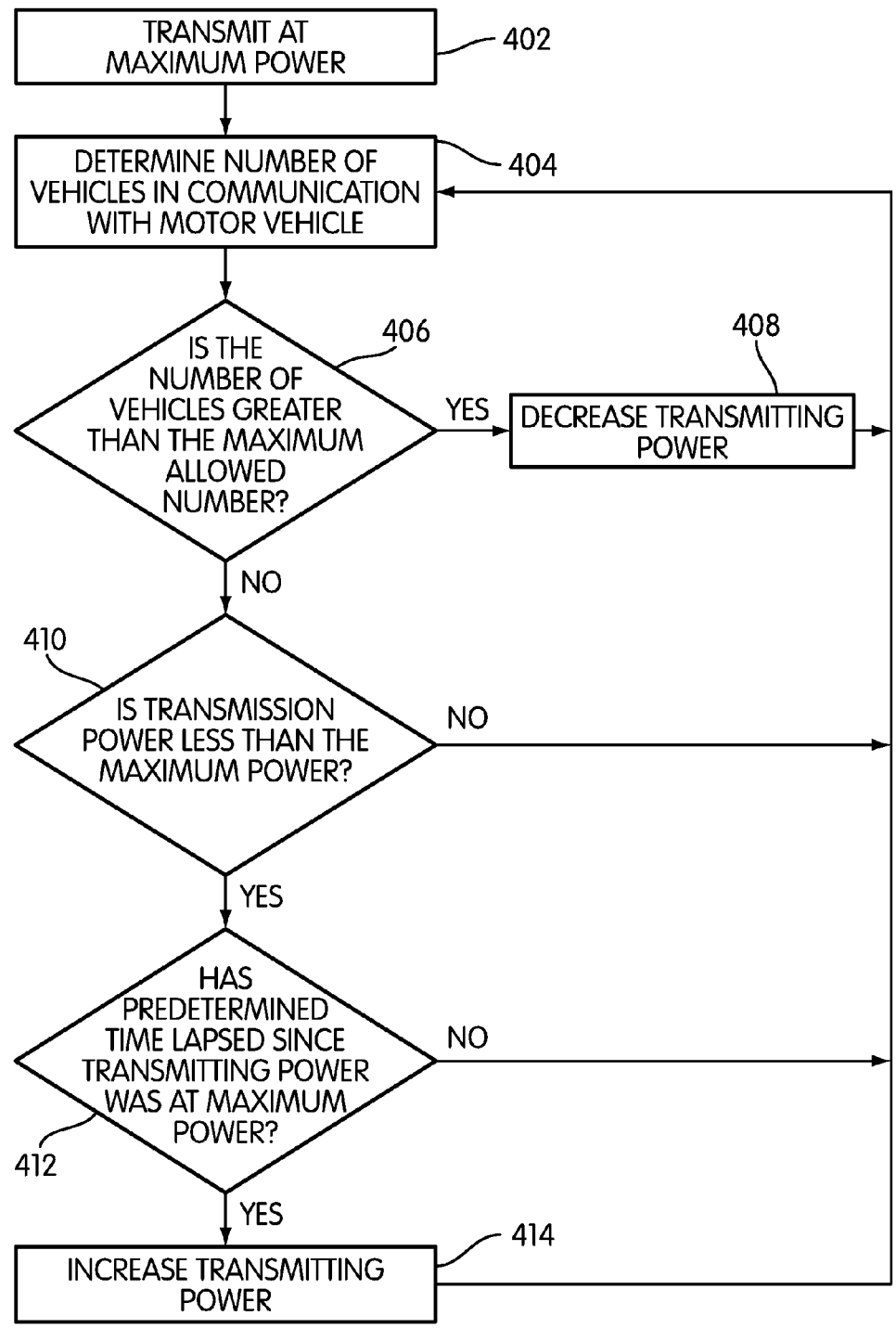
FIG. 4 is an embodiment of a process for adjusting transmitting power to reduce channel saturation in a vehicle communication network.

FIG. 4 illustrates an embodiment of a process for adjusting the transmitting power of signals sent over a vehicle communication network. In this embodiment, the following steps may be performed by ECU 120; however in some embodiments these steps may be performed by additional systems or devices associated with motor vehicle 102. In addition, it will be understood that in other embodiments one or more of the following steps may be optional.

During a first step 402, ECU 120 may begin transmitting messages at maximum power. The value of the maximum power may be determined according to various constraints on one or more systems associated with motor vehicle 102. In some cases, for example, the value of the maximum power may be constrained by the type of network used. In an exemplary embodiment, the maximum power may be a predetermined parameter that is established during the manufacturing of motor vehicle 102.

Following step 402, during step 404, ECU 120 may determine the number of vehicles in communication with motor vehicle 102. This step can be achieved using any method known in the art for determining the number of sources that may be sharing a communication channel or specific frequency. In some embodiments, a vehicle can be equipped with a channel utilization detection mechanism. Next, during step 406, ECU 120 may determine if the number of vehicles in communication with motor vehicle 102 is greater than a maximum allowed number. In some cases, the maximum allowed number may be a number associated with channel saturation. In the embodiments illustrated in FIG. 1 through 3, for example, the maximum allowed number is 50. In other words, channel saturation occurs when more than 50 vehicles communicate on a network channel at the same time.

If, during step 406, ECU 120 determines that the number of vehicles in communication with motor vehicle 102 is greater than the maximum allowed number, then ECU 120 may proceed to step 408. During step 408, ECU 120 may decrease the transmitting power of all broadcasted messages. This effectively reduces the transmitting area of the broadcast messages and may reduce the number of vehicles that may receive messages from motor vehicle 102. Following step 408, ECU 120 may return to step 404 to determine the number of vehicles in communication with motor vehicle 102.

In different embodiment, the transmitting power can be reduced by varying amounts during step 408. In some cases, the transmitting power can be reduced by a constant value. In other cases, the transmitting power can be reduced by a value that depends on one or more operating parameters of the motor vehicle. In still other cases, the transmitting power can be reduced by a value that depends on the number of vehicles in communication with the motor vehicle.

If, during step 406, ECU 120 determines that the number of vehicles in communication with motor vehicle 102 is less than the maximum allowed number, or equal to the maximum allowed number, ECU 120 may proceed to step 410. During step 410, ECU 120 may determine if the transmitting power is less than the maximum power. If the transmitting power is not less than the maximum power, then ECU 120 may proceed back to step 404. Otherwise, ECU 120 may proceed to step 412. During step 412, ECU 120 may determine if a predetermined amount of time has lapsed since the transmitting power was at maximum power. In different embodiments, the predetermined time could vary. In one embodiment, for example, the predetermined time could be approximately 100 milliseconds. In other cases, however, the predetermined time could be less than 100 milliseconds. In still other cases, the predetermined time could be more than 100 milliseconds. If, during step 412, ECU 120 determines that the predetermined time has passed since the transmitting power was at maximum power, ECU 120 may proceed to step 414, where the transmitting power is increased. Otherwise, ECU 120 may proceed back to step 404. With this arrangement, steps 410 through 414 provide a method for increasing the power after a predetermined amount of time. In other words, steps 410 through 414 may allow the system to increase the transmitting power after some time in situations where channel saturation is not likely to occur. This allows the communication system to increase the transmitting power as the vehicle travels from a congested area to an uncongested area where a higher transmitting power can be used.

A motor vehicle configured to communicate with other vehicles using a vehicle communication network can include other provisions for reducing channel saturation. In some embodiments, a motor vehicle can be configured to increase the transmitting period of messages. The term "transmitting period" refers to the interval of time between successive messages. By reducing the transmitting period the number of vehicles simultaneously communicating over a network channel may be reduced, which can reduce or substantially eliminate channel saturation.

FIGS. 5 and 6 illustrate embodiments of motor vehicle 102 traveling on roadways in various traffic conditions. Referring to FIG. 5, motor vehicle 102 may experience light traffic conditions on roadway 500. In this case, motor vehicle 102 may not be in communication with a large number of vehicles. Since channel saturation of the vehicle communication network is unlikely to occur in this situation, motor vehicle 102 may transmit messages with a small transmitting period. For example, in some cases, motor vehicle 102 may transmit messages approximately every 0.2 seconds. In other words, the frequency of transmissions, which is the reciprocal of the period, is approximately five messages a second.

Referring to FIG. 6, motor vehicle 102 may experience heavier traffic conditions at a later time on roadway 500. In this case, motor vehicle 102 may be in communication with a relatively large number of vehicles. In order to reduce the likelihood of channel saturation, motor vehicle 102 may transmit messages with a large transmitting period. For example, in some cases, motor vehicle 102 may transmit messages approximately every 0.5 seconds. In other words, motor vehicle 102 may transmit approximately 2 messages a second.

In some embodiments, the methods employed by motor vehicle 102 are also employed by other vehicles on roadway 500 to ensure that channel saturation is significantly reduced. In other words, other vehicles on roadway 500 may also attempt to increase the transmitting period (i.e., reduce the frequency of messages) of any messages sent over the vehicle communication network. This arrangement may help reduce the total number of vehicles simultaneously communicating over a network channel, which can help to reduce or substantially eliminate channel saturation. In an exemplary embodiment, each motor vehicle on roadway 500 may be equipped with a communication system that is configured to increase the transmitting period of any broadcast messages when there is channel saturation on a network channel.

It will be understood that the examples given in FIGS. 5 and 6 are only intended to be exemplary. In other embodiments, a motor vehicle can transmit messages or any type of information with any other type of transmitting period. For example, in another embodiment, a motor vehicle may transmit messages with any transmitting period in the range between 0.01 seconds and 10 seconds. In still other embodiments, the transmitting period can be less than 0.01 seconds. In still other embodiments, the transmitting period can be greater that 10 seconds. In addition, while the above embodiment discusses transmitting periods that are regular, other embodiments may include irregular transmitting periods. Furthermore, in embodiments where messages may be transmitted at irregular intervals, the transmitting period can be calculated as an average transmitting period for any given time interval.

Figure 7:
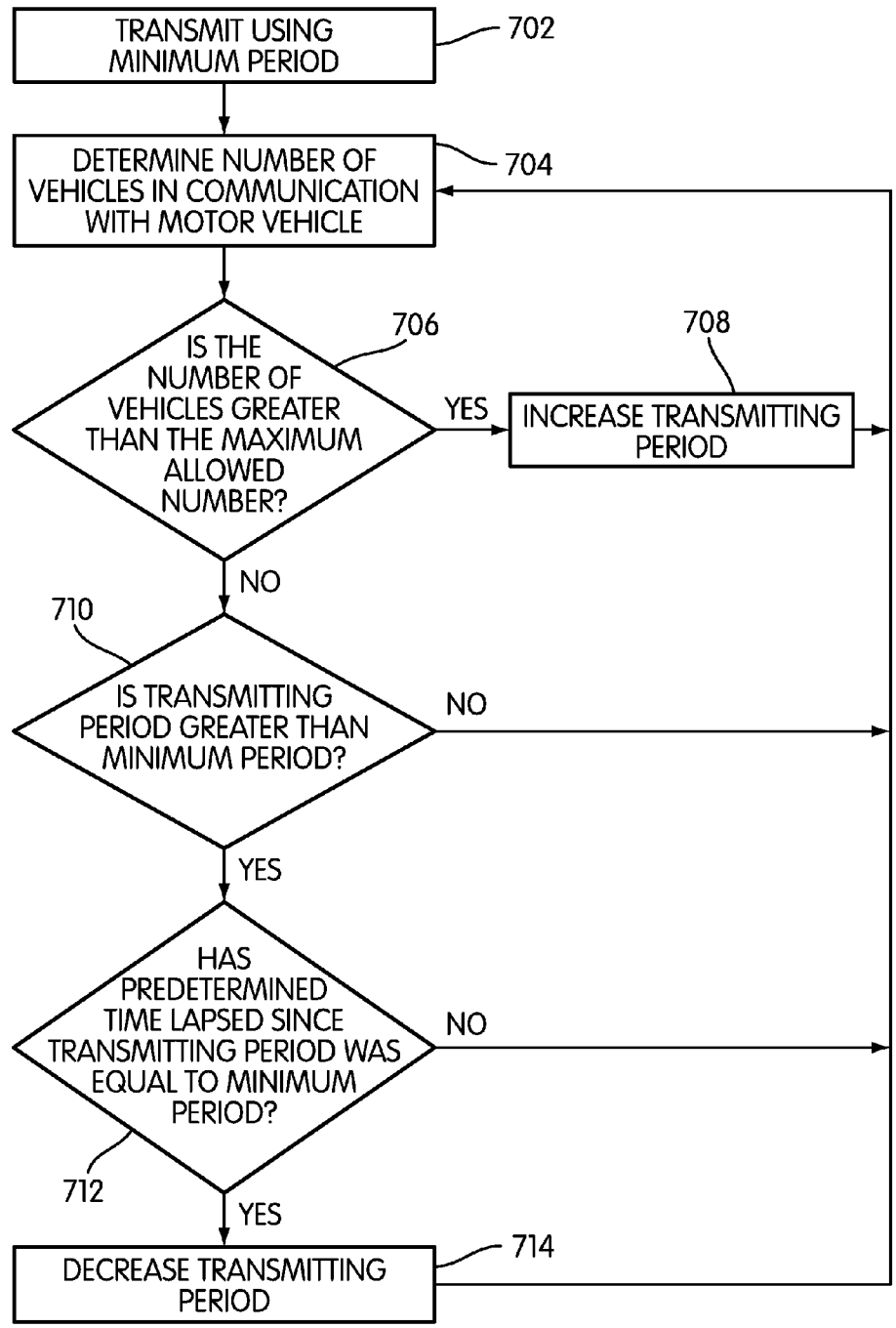
FIG. 7 is an embodiment of a process of adjusting transmitting period to reduce channel saturation in a vehicle communication network.

FIG. 7 illustrates an embodiment of a process for adjusting the transmitting period of messages sent over a vehicle communication network. In this embodiment, the following steps may be performed by ECU 120; however in some embodiments these steps may be performed by additional systems or devices associated with motor vehicle 102. In addition, it will be understood that in other embodiments one or more of the following steps may be optional.

During a first step 702, ECU 120 may begin transmitting messages using a minimum period. The value of the minimum period may be determined according to various constraints on one or more systems associated with motor vehicle 102. In some cases, for example, the value of the minimum period may be constrained by the type of network used. In an exemplary embodiment, the minimum period may be a predetermined parameter that is established during the manufacturing of motor vehicle 102.

Following step 702, during step 704, ECU 120 may determine the number of vehicles in communication with motor vehicle 102. This step can be achieved using any method known in the art for determining the number of sources that may be sharing a communication channel or specific frequency. Next, during step 706, ECU 120 may determine if the number of vehicles in communication with motor vehicle 102 is greater than the maximum allowed number. In some cases, the maximum allowed number may be a number associated with channel saturation. In the embodiments illustrated in FIG. 1 through 3, for example, the maximum allowed number is 50 before channel saturation occurs.

If, during step 706, ECU 120 determines that the number of vehicles in communication with motor vehicle 102 is greater than the maximum allowed number, then ECU 120 may proceed to step 708. During step 708, ECU 120 may increase the transmitting period of all broadcasted messages. This reduces the number of messages transmitted in a given time interval and may help reduce or eliminate channel saturation. Following step 708, ECU 120 may return to step 704 to determine the number of vehicles in communication with motor vehicle 102.

In different embodiment, the transmitting period can be increased by varying amounts during step 708. In some cases, the transmitting period can be increased by a constant value. In other cases, the transmitting period can be increased by a value that depends on one or more operating parameters of the motor vehicle. In still other cases, the transmitting period can be increased by a value that depends on the number of vehicles in communication with the motor vehicle.

If, during step 706, ECU 120 determines that the number of vehicles in communication with motor vehicle 102 is less than the maximum allowed number, or equal to the maximum allowed number, ECU 120 may proceed to step 710. During step 710, ECU 120 may determine if the transmitting period is greater than the minimum period. If the transmitting period is not greater than the minimum period, then ECU 120 may proceed back to step 704. Otherwise, ECU 120 may proceed to step 712. During step 712, ECU 120 may determine if a predetermined amount of time has lapsed since the transmitting period was equal to the minimum period. In different embodiments, the predetermined time could vary. In one embodiment, for example, the predetermined time could be approximately 100 milliseconds. In other cases, however, the predetermined time could be less than 100 milliseconds. In still other cases, the predetermined time could be more than 100 milliseconds. If, during step 712, ECU 120 determines that the predetermined time has passed since the transmitting period was equal to the minimum period, ECU 120 may proceed to step 714, where the transmitting period is decreased. Otherwise, ECU 120 may proceed back to step 704. With this arrangement, steps 710 through 714 provide a method for decreasing the period (which increases the frequency or number of messages sent in a given amount of time) after a predetermined amount of time. With this arrangement, steps 710 through 714 provide a method for decreasing the transmitting period after a predetermined amount of time. In other words, steps 710 through 714 may allow the system to decrease the transmitting period after some time in situations where channel saturation is not likely to occur. This allows the communication system to decrease the transmitting period as the vehicle may travel from a congested area to an uncongested area where a higher transmitting power can be used.

Although the previous embodiments discuss altering the transmitting power or the transmitting period of any transmitted information for purposes of reducing channel saturation, it will be understood that in some embodiments a motor vehicle may be configured to adjust both the transmitting power and the transmitting period substantially simultaneously. In another embodiment, for example, a motor vehicle can include provisions for adjusting the transmitting period and the transmitting power substantially simultaneously until the number of vehicles communicating on a network channel is below the maximum number of vehicles associated with channel saturation. Furthermore, in embodiments where all vehicles communicating on a vehicle communication network are configured to alter the transmitting power and/or transmitting period of any outgoing messages, the number of vehicles communicating on a network channel can be fined tuned in an attempt to reduce or substantially eliminate channel saturation.

A motor vehicle can include provisions for altering the transmitting power and/or the transmitting period of any transmitted information according to various vehicle operating parameters. For example, in some cases, the transmitting power and/or transmitting period of messages can be altered according to the vehicle speed of a motor vehicle. In one embodiment, vehicles traveling above a predetermined threshold speed can be configured to transmit at higher transmitting powers and/or lower transmitting periods than vehicles traveling at speeds below the predetermined threshold. In another embodiment, the transmitting power and transmitting period may be altered in a substantially continuous manner as a function of the vehicle speed. This arrangement can help provide more information for a vehicle communication network regarding high speed vehicles which can pose a greater safety threat than lower speed vehicles.

Figures 8, 9:
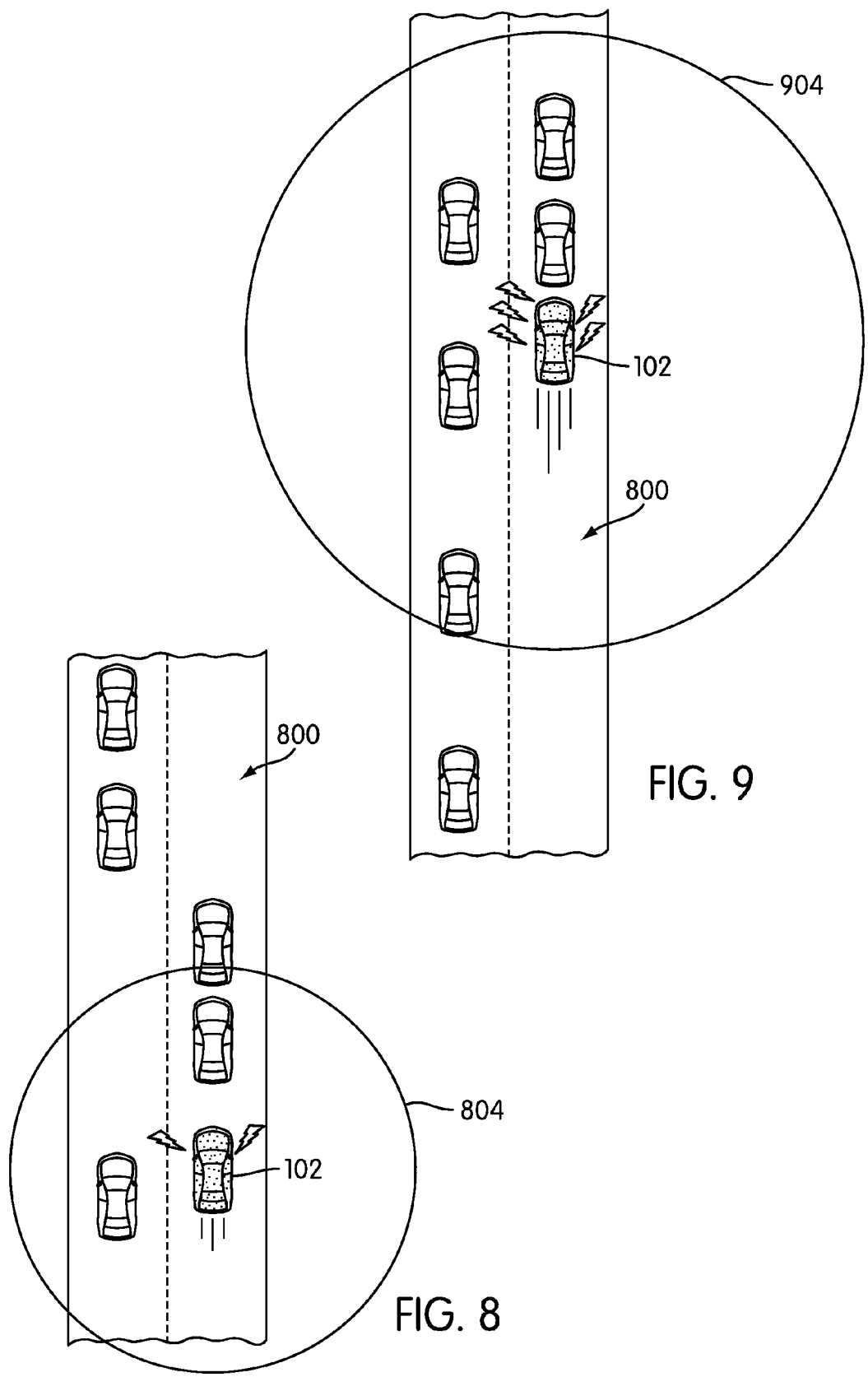
FIG. 8 is a schematic view of an embodiment of a motor vehicle transmitting information over a vehicle communication network.
FIG. 9 is a schematic view of an embodiment of a motor vehicle transmitting information over a vehicle communication network.

FIGS. 8 and 9 illustrate embodiments of motor vehicle 102 traveling on roadway 800 at different speeds. Referring to FIG. 8, motor vehicle 102 initially travels at a first speed. For example, motor vehicle 102 may travel at a speed of approximately 30 miles per hour. Since motor vehicle 102 is traveling relatively slowly, motor vehicle 102 may be configured to transmit messages with a relatively low transmitting power and a relatively large transmitting period. In this case, for example, motor vehicle 102 may transmit messages with a transmitting period of approximately 0.5 seconds, or two messages per second. In addition, motor vehicle 102 may be configured to transmit messages with a relatively low transmitting power that is associated with first transmitting area 804.

Referring to FIG. 9, motor vehicle 102 may be traveling at a second speed at a later time on roadway 800. In particular, the second speed may be larger than the first speed. For example, motor vehicle 102 may travel at a speed of approximately 65 miles per hour. Since motor vehicle 102 is traveling at a relatively high speed, motor vehicle 102 may be configured to transmit messages with a relatively high transmitting power and a relatively small transmitting period. In this case, motor vehicle 102 may transmit messages with a transmitting period of approximately 0.2 seconds, or five messages per second. In addition, motor vehicle 102 may be configured to transmit messages with a relatively high transmitting power that is associated with second transmitting area 904. In particular, second transmitting area 904 may be a larger transmitting area than first transmitting area 804. Likewise, the frequency of messages (which is the reciprocal of the period) sent out when motor vehicle 102 travels at the second speed may be greater than the frequency of messages send out when motor vehicle 102 travels at the first speed. This arrangement may substantially reduce channel utilization and help to prevent channel saturation.

In some embodiments, other vehicles communicating with motor vehicle 102 on a vehicle communication network may be configured to alter the transmitting power and transmitting period of any transmitted signals according to vehicle speed. With this arrangement, vehicles traveling at high speeds may be configured to broadcast more messages in a given time period to provide more up to date information to surrounding vehicles. In addition, these high speed vehicles may also be configured to broadcast messages over a larger area to provide information to a larger number of vehicles. In contrast, vehicles traveling at relatively low speeds may be configured to broadcast less messages in a given time period. Also, these low speed vehicles may be configured to transmit messages over a smaller area, which effectively reduces the number of vehicles configured to receive the messages. This can help to prevent channel saturation by reducing overall channel utilization.

In some embodiments, vehicles may be configured to adjust transmitting power and/or transmitting period for messages in a continuous manner, as discussed above. For example, a motor vehicle may adjust the transmitting power of messages in an iterative manner, until the number of vehicles in communication with the motor vehicle is below a predetermined maximum number of vehicles. Also, a motor vehicle may adjust the transmitting period of messages in an iterative manner, until the number of vehicles in communication with the motor vehicle is below the predetermined maximum number of vehicles. In other embodiments, however, vehicles may be configured to adjust transmitting power and/or transmitting period in discrete values. For example, in some cases, a vehicle may transmit messages at either a low power or a high power. Also, a vehicle may be configured to transmit messages using one of a set of discrete transmitting periods or frequencies (which is the reciprocal of the period). For example, in some cases, a vehicle may transmit messages with a frequency in a range between 1 to 10 messages per second.

Figure 10:
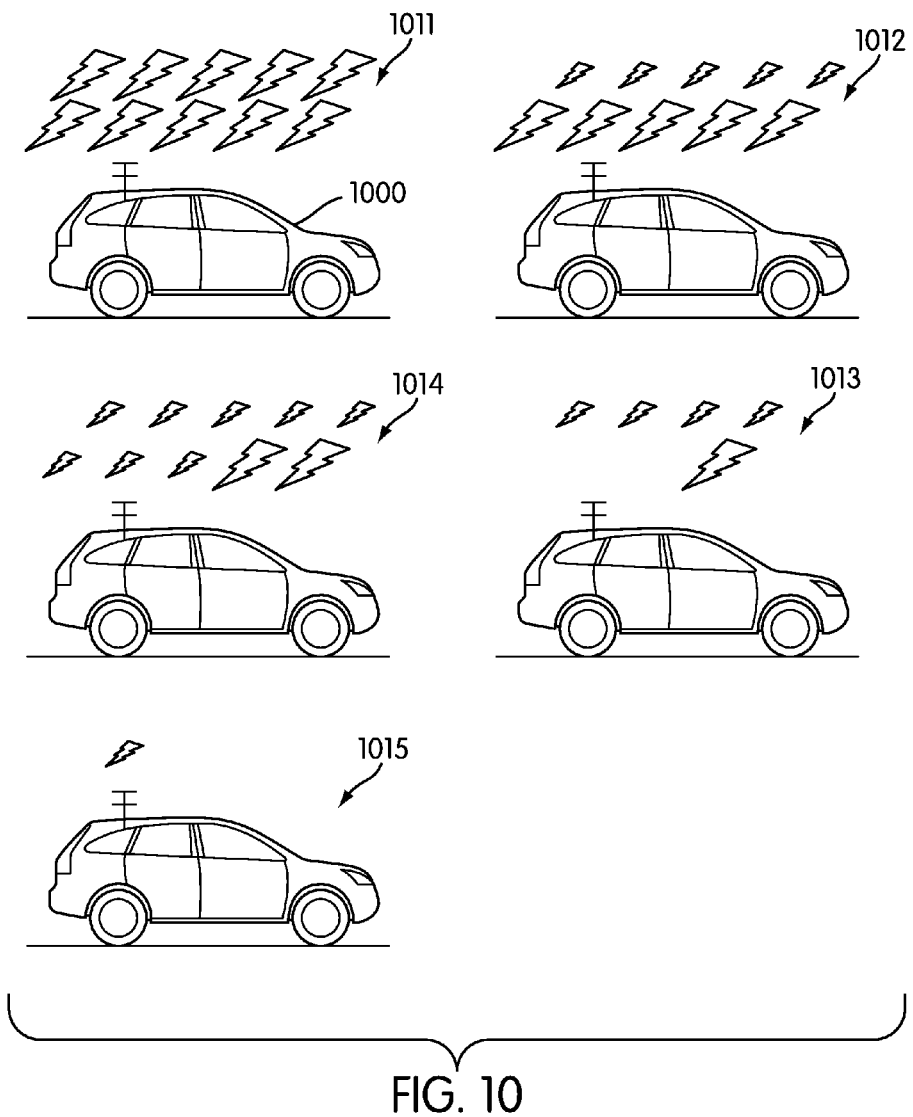
FIG. 10 is a schematic view of an embodiment of different transmitting states for a motor vehicle.

FIG. 10 illustrates an embodiment of various transmitting states for a motor vehicle. The term "transmitting state" refers to a state in which a motor vehicle is configured to transmit a first fixed number of messages per second at high power and a second fixed number of messages per second at low power. Referring to FIG. 10, in some embodiments, a motor vehicle can be configured to operate in five distinct transmitting states. In this case, motor vehicle 1000 may be configured to operate in either first transmitting state 1011, second transmitting state 1012, third transmitting state 1013, fourth transmitting state 1014 or fifth transmitting state 1015. Each transmitting state can be associated with a first fixed number of high power messages sent per second and a second fixed number of low power messages.

In one embodiment, first transmitting state 1011 may be associated with 10 high power messages and no low power messages. In other words, when a vehicle is operating in first transmitting state 1011, 10 high power messages may be transmitted every second. In some cases, this transmitting state may be used when channel saturation is not a concern and allows for the maximum number of messages to be transmitted at maximum transmitting power. Second transmitting state 1012 may be associated with 5 high power messages and 5 low power messages. In other words, when a vehicle is operating in second transmitting state 1012, 5 high power messages may be transmitted each second and also 5 low power messages may be transmitted each second. In a similar manner, third transmitting state 1013 may be associated with 2 high power messages and 8 low power messages. Fourth transmitting state 1014 may be associated with 1 high power message and 4 low power messages. Finally, fifth transmitting state 1015 may be associated with 1 low power message. In particular, fifth transmitting state 1015 may be a state in which no high powered messages are sent. In some cases, fifth transmitting state 1015 may be used when channel saturation is a concern and when motor vehicle 1000 is traveling at a very slow speed and therefore does not pose any substantial safety threat.

Although the exemplary embodiment illustrates five different transmitting states, in other embodiments, more or less than five transmitting states could be used. In addition, in some cases, transmitting states can be associated with more than two distinct power levels. For example, in another embodiment, a transmitting state could be associated with a high power level, a low power level and an intermediate power level. Also, while the exemplary embodiment includes transmitting states that are associated with a frequency of 10 or less messages per second, in other embodiments the maximum frequency of messages could be greater than 10 messages per second.

In some embodiments, a communication system can be configured to transition between different transmitting states according to various operating parameters as well as the number of vehicles utilizing a network channel. In some embodiments, a communication system can include one or more algorithms for determining how to transition between various transmitting states. In one embodiment, a finite state machine type algorithm can be used. For example, a finite state machine may comprise each of the five transmitting states discussed in FIG. 10. In addition, transitions between states may be controlled according to the current vehicle speed and the current number of vehicles in communication with the motor vehicle. In particular, by comparing the number of vehicles in communication with the motor vehicle with the maximum number of vehicles and the vehicle speed with a maximum vehicle speed (or threshold speed), ECU 120 may determine how a communication system may transition between different transmitting states. In cases where a state machine is used to determine transmitting states, the state transition time (the amount of time that passes before transitioning between states) can be a calibration value.

Figure 11:
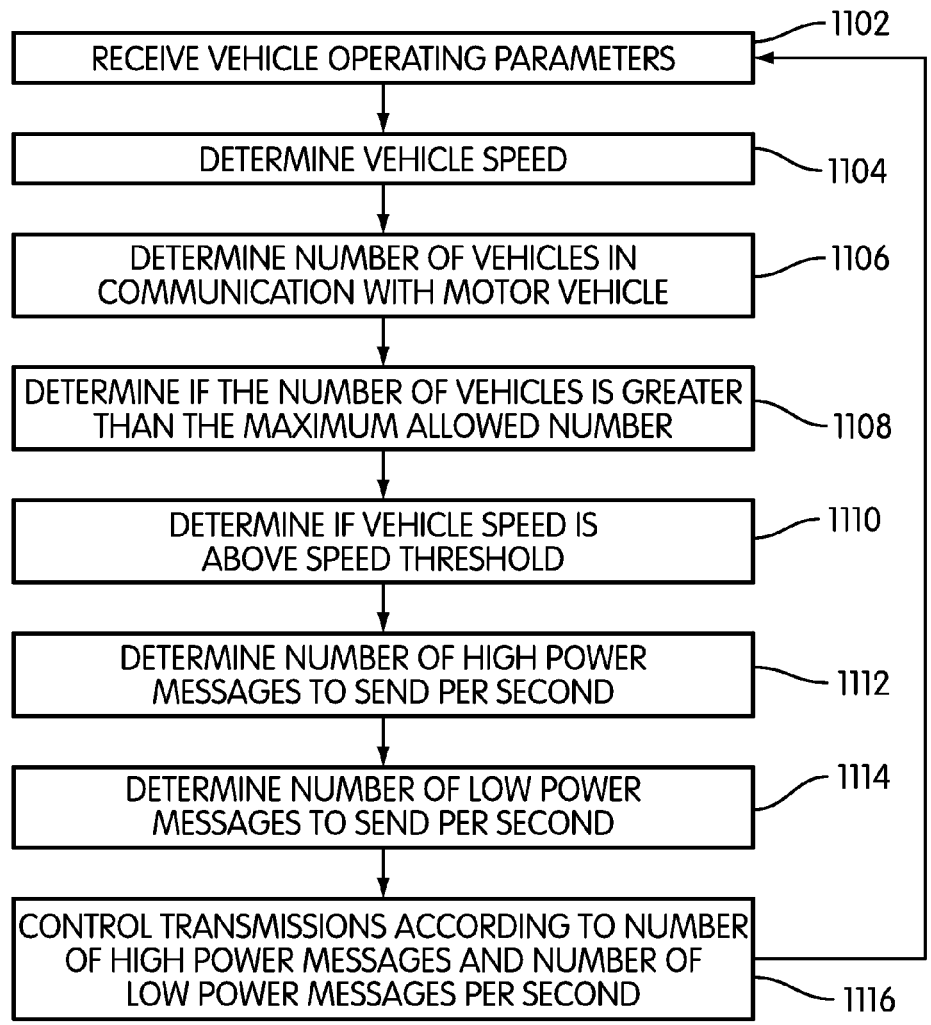
FIG. 11 is an embodiment of a process for adjusting transmitting power and transmitting period in a vehicle communication network.

FIG. 11 illustrates an embodiment of a process for operating a motor vehicle in different transmitting states. In this embodiment, the following steps may be performed by ECU 120; however in some embodiments these steps may be performed by additional systems or devices associated with motor vehicle 102. In addition, it will be understood that in other embodiments one or more of the following steps may be optional.

During a first step 1102, ECU 120 may receive one or more vehicle operating parameters. In some cases, the vehicle operating parameters can include information related to vehicle speed. Following step 1102, during step 1104, ECU 120 may determine the current vehicle speed. In some cases, the vehicle speed can be determined using GPS information. In other cases, the vehicle speed can be determined using information received from a vehicle speed sensor. In still other cases, the vehicle speed can be determined in any other manner.

Following step 1104, ECU 120 may proceed to step 1106. During step 1106, ECU 120 may determine the number of vehicles in communication with motor vehicle 102. This step can be achieved using any method known in the art for determining the number of sources that may be sharing a communication channel or specific frequency. Next, during step 1108, ECU 120 may determine if the number of vehicles in communication with motor vehicle 102 is greater than the maximum allowed number.

Following step 1108, during step 1110, ECU 120 may determine if the vehicle speed is above a speed threshold. In some cases, the speed threshold can be a predetermined parameter. In some cases, the value of the speed threshold can be a calibrated value. Next, during step 1112, ECU 120 may determine the number of high power messages to send per second. Following step 1112, during step 1114, ECU 120 can determine the number of low power messages to send per second. In some cases, the decisions made in step 1112 and step 1114 can be made by considering the current vehicle speed and the number of vehicles in communication with motor vehicle 102. In one embodiment, for example, a finite state machine type algorithm can be used to determine a transmitting state of the vehicle, which is associated with a predetermined number of high power messages and a predetermined number of low power messages.

Following step 1114, ECU 120 may proceed to step 1116. During step 1116, ECU 120 may control transmissions on the vehicle communication network according to the number of high power messages and the number of low power messages determined during step 1112 and step 1114, respectively. Following this, ECU 120 may return to step 1102. With this arrangement, step 1102 through step 1114 may be performed iteratively as a motor vehicle continues to communicate on a vehicle communication network.

It will be understood that while the current embodiment discusses a single speed threshold, in other embodiments more than one speed threshold could be used. Also, in some cases, ranges of speeds could be used, rather than one or more threshold values. In addition, it will be understood that other vehicle parameters could be used for controlling a motor vehicle in different transmitting states. In one embodiment, for example, an acceleration threshold could be used. In this alternative embodiment, vehicles accelerating at a rate above the acceleration threshold could be associated with a larger number of high power messages than vehicles accelerating at a rate below the acceleration threshold.

The principles discussed in the embodiments discussed above may be used with any object that transmits messages in any type of communication network. In some cases, the communication network could be a network with only vehicles as nodes. In other cases, however, the communication network could include other sources as nodes. For example, in another embodiment, one or more roadside units capable of communicating over a vehicle communication network can include provisions for modifying transmitting power or transmitting period in order to reduce or eliminate channel saturation.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a motor vehicle, comprising the steps of:
    transmitting information at a transmitting power;
    determining a number of remote vehicles in communication with the motor vehicle, the communication being established on a vehicle communication network;
    determining if the number of remote vehicles is greater than a maximum allowed number, the maximum allowed number being associated with channel saturation of the vehicle communication network;
    reducing the transmitting power when the number of remote vehicles is greater than the maximum allowed number; and
    further comprising:
    determining if the transmitting power is less than a maximum power when the number of remote vehicles is not greater than the maximum allowed number; and
    increasing the transmitting power when a predetermined time has passed since the transmitting power was at the maximum power.

2. The method according to claim 1, wherein the predetermined time is approximately 100 milliseconds.

3. The method according to claim 1, wherein the motor vehicle is configured to operate in two or more transmitting states and wherein a first transmitting state is associated with a first number of high power messages sent per second and wherein a second transmitting state is associated with a second number of high power messages sent per second and wherein the first number is different than the second number.

4. The method according to claim 1, wherein the maximum allowed number has a value of 50 or less.

5. The method according to claim 1, wherein the step of reducing the transmitting power includes reducing the transmitting power by a constant value.

6. The method according to claim 1, wherein the step of reducing the transmitting power is followed by a step of reducing a transmitting period.

7. A method of operating a motor vehicle, comprising the steps of:
    transmitting information at a transmitting period, the transmitting period comprising an interval of time between successive messages;
    determining a number of remote vehicles in communication with the motor vehicle, the communication being established on a vehicle communication network;
    determining if the number of remote vehicles is greater than a maximum allowed number, the maximum allowed number being associated with channel saturation of the vehicle communication network; and
    increasing the transmitting period when the number of remote vehicles is greater than the maximum allowed number such that successive messages are sent less frequently.

8. The method according to claim 7, wherein the method includes a step of determining if the transmitting period is greater than a minimum period.

9. The method according to claim 8, wherein the method includes a step of decreasing the transmitting period when a predetermined time has passed since the transmitting period was equal to the minimum period.

10. The method according to claim 7, wherein the step of increasing the transmitting period includes increasing the transmitting period by a constant value.

11. The method according to claim 7, wherein the step of increasing the transmitting period is followed by a step of reducing the transmitting power.

12. A method of operating a motor vehicle, comprising the steps of:
   transmitting information using a transmitting characteristic;
   determining a vehicle speed;
   determining a number of remote vehicles in communication with the motor vehicle, the communication being established on a vehicle communication network;
   determining if the number of remote vehicles is greater than a maximum allowed number, the maximum allowed number being associated with channel saturation of the vehicle communication network;
   adjusting the transmitting characteristic associated with transmitting information based on the vehicle speed when the number of remote vehicles is greater than the maximum allowed number.

13. The method according to claim 12, wherein the transmitting characteristic is transmitting power.

14. The method according to claim 13, wherein a step of adjusting the transmitting characteristic includes reducing the transmitting power.

15. The method according to claim 12, wherein the transmitting characteristic is transmitting period.

16. The method according to claim 15, wherein the step of adjusting the transmitting characteristic includes increasing the transmitting period.

17. The method according to claim 12, wherein the motor vehicle is configured to operate in two or more transmitting states and wherein a first transmitting state is associated with a first number of high power messages sent per second and wherein a second transmitting state is associated with a second number of high power messages sent per second and wherein the first number is different than the second number.

18. The method according to claim 17, wherein the first transmitting state is associated with a first number of low power messages sent per second and wherein the second transmitting state is associated with a second number of low power messages sent per second and wherein the first number is different than the second number.

19. The method according to claim 18, wherein the transition between the first transmitting state and the second transmitting state is controlled according to the current vehicle speed and the current number of vehicles in communication with the motor vehicle.

20. The method according to claim 19, wherein the transition between the first transmitting state and the second transmitting state is controlled using a finite state machine.

* * * * *